Figure 1:
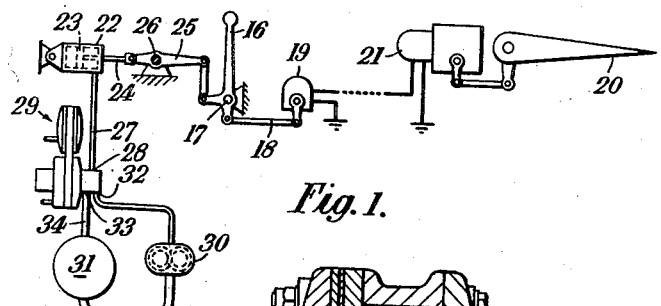

April 15, 1958 L. S. GREENLAND ET AL 2,830,778
FEEL SIMULATOR FOR AIRCRAFT
Filed Nov. 30, 1955

INVENTORS.
LEONARD SIDNEY GREENLAND
ROY WESTBURY
CHARLES PHILIP SMITH
BY Moses, Neet, Crews & Berry
ATTORNEYS.

United States Patent Office 2,830,778
Patented Apr. 15, 1958

2,830,778

FEEL SIMULATOR FOR AIRCRAFT

Leonard Sidney Greenland, Wolverhampton, and Roy Westbury, Bridgnorth, Salop, England, and Charles Philip Smith, Ramsey, Isle of Man, assignors to H. M. Hobson Limited, London, England, a British company Application November 30, 1955, Serial No. 550,183

Claims priority, application Great Britain December 15, 1954

3 Claims. (Cl. 244—83)

In aircraft fitted with power-operated control surfaces, or in which the control surfaces are operated by servo tabs, the aerodynamic loads on the control surfaces are not felt by the pilot, and it is known to provide the pilot with a feel simulator which will impose on his control member loads representative of the aerodynamic loading on the control surfaces.

In United States application No. 407,536/54, now Patent No. 2,783,006, we have described and claimed a feel simulator, comprising a linkage operable by the control member to effect relative movement of a piston and a housing for the piston and thereby to displace liquid from the housing against a hydraulic resistance, said linkage being such that the resistance opposing movement of the control member increases progressively with displacement of the control member in either direction from a neutral position, a control valve for controlling the hydraulic pressure prevailing in the housing, and a device responsive to airspeed which is operative on the valve to establish in the housing a hydraulic pressure which varies as a function of airspeed, the control valve being subject to the hydraulic pressure in the housing and also to a force opposing the hydraulic pressure and applied to the control valve by the airspeed responsive device, the control valve normally closing the outlet for liquid from the housing, being movable from its normal position, to increase or decrease the hydraulic pressure in the housing, in response respectively to increase or decrease in the airspeed over a predetermined range of airspeeds and also being movable from its normal position to permit liquid to flow from and to the housing, in response respectively to movement of the control member away from and towards its neutral position.

The relationship between the hinge moment of an aircraft control surface and its angular position in relation to the aircraft varies both with the airspeed and altitude of the aircraft. The control surface angle required to produce a manoeuvre or an acceleration expressed as a given value of "g", where g is the value given to the acceleration due to gravity, therefore also varies with speed and altitude. Generally speaking, the object of a feel simulator is to maintain a constant value of stick force per "g" irrespective of all other effects.

Subsonically this is approximately fulfilled if the control pressure in the housing is varied in direct proportion to "q" (the difference between static atmospheric pressure and the total pressure derived from the forward speed of the aircraft), as described in United States application No. 407,536/54. Sometimes, however, it is required that the graph (normally a straight line) relating, as ordinates, control pressure (i. e. the hydraulic pressure opposing movement of the pilot's control member) and, as abscissae, "q" should change its slope at a predetermined value of airspeed.

It is accordingly an object of the invention to provide a feel simulator for aircraft in which the feel varies with airspeed according to one law up to a predetermined airspeed or Mach number and according to another law beyond said predetermined airspeed or Mach number.

Figure 2:
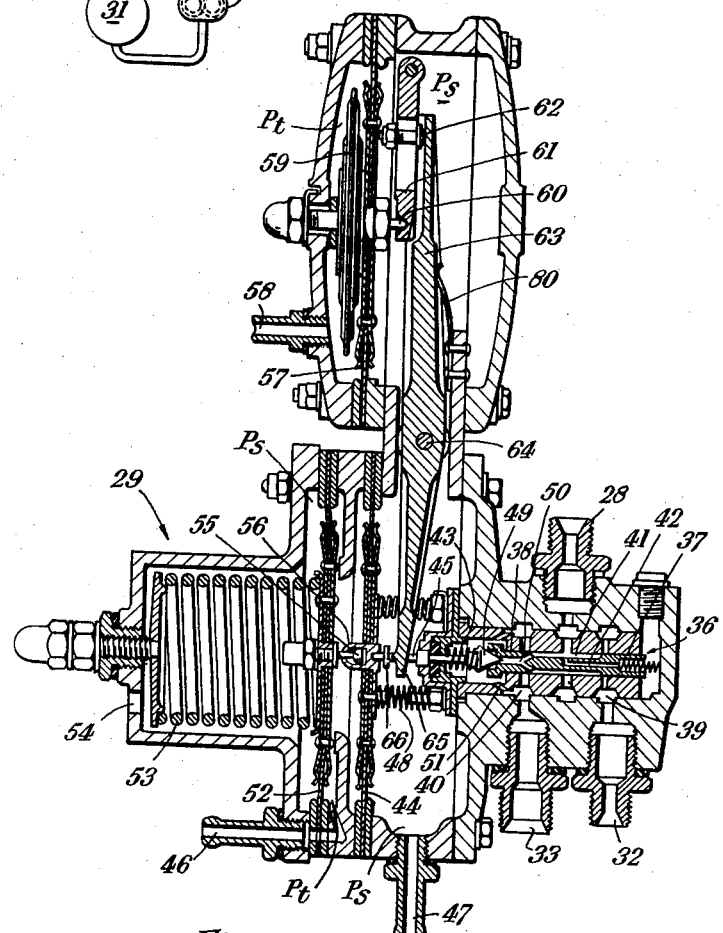

One embodiment of the invention will now be described in detail, by way of example, with reference to the accompanying drawing in which:

Fig. 1 is a diagram showing a typical installation according to the invention and Fig. 2 is a section through the control unit of the feel simulator.

Fig. 1 shows diagrammatically a pilot's control member 16, pivoted at 17, and coupled by a connection 18 to the transmitter 19 of a servo mechanism for actuating the control surface 20 of an aircraft, the receiver of the servo mechanism being indicated at 21. As will be well understood the servo mechanism 19, 21 serves to displace the control surface 20 in a direction and to an extent determined by the movement of the control member 16 from a neutral position.

The feel simulator comprises a hydraulic jack constituted by a cylinder 22 and piston 23, the piston rod 24 being connected to the control member by a lever 25, pivoted intermediately at 26 and at its ends to the control member and piston rod respectively. Movement of the control member 16 in either direction away from its neutral position will draw the piston 23 to the right to expel liquid from the cylinder 22 through an outlet, connected by a single line 27 to a port 28 in a control unit 29, which determines the hydraulic pressure prevailing in the cylinder 22 of the jack, herein referred to as the control pressure. A pump 30 drawing liquid from a reservoir 31, supplies liquid under pressure to the inlet 32 of the unit 29, which has an exhaust outlet 33 communicating, via a conduit 34, with the reservoir 31.

As will be apparent, the lever 25 works at a progressively decreasing mechanical advantage as the control member 16 is moved away from its neutral position. Consequently the resistance to movement of the control member 16, and therefore the feel imparted by the feel simulator, increases with displacement of the control member. The feel is also varied in accordance with changes in airspeed by the unit 29 as will now be described.

The control unit 29 contains a piston type control valve 36 (Fig. 2) for determining the control pressure prevailing in the jack. The valve 36 has lands 37, 38 coacting respectively with a pressure port 39 and with an exhaust port 40, and a waisted portion 41 communicating, via the port 28, with the signal line 27 (Fig. 1). The control pressure in the jack consequently prevails in the waisted portion 41 of the valve and acts on one end of the valve through a passage 42. The valve 36 is normally held balanced, in the neutral position shown, against the control pressure by the force exerted on the valve by a spring 43, assisted by the pressure exerted on the valve by a diaphragm 44 through the agency of a push rod 45.

The surface of the diaphragm 44 remote from the control valve is subject to total pressure, $P_t$, applied thereto through an inlet 46, and the other side of the diaphragm is subject to static air pressure, $P_s$, applied thereto through an inlet 47. If the airspeed increases, the valve 36 is moved in the direction to connect the pressure port 39 to the outlet 28, so causing the control pressure in the jack to rise to a value at which it can return the valve to its neutral position. On reduction in the airspeed, the valve 36 moves in the other direction to connect the outlet 28 to the exhaust port 40, and the control pressure in the jack consequently falls until it reaches the value appropriate to the reduced airspeed.

The valve 36 also moves in opposite directions in response to the movement of the control member towards and away from its neutral position, to permit liquid to flow respectively into and out of the jack through the signal line 27.

Springs 48 maintain the diaphragm out of contact with the push rod 45 at low airspeeds, the control pressure in the jack then being determined solely by the spring 43. As soon, however, as the diaphragm 44 becomes operative, at higher airspeeds, on the push rod 45 the control pressure begins to increase with increasing airspeeds. A relief valve 49 is mounted on the end of the push rod 45 adjoining the control valve 36 and is subjected to the control pressure through a passage 50 in the control valve. It is normally held closed by the push rod assisted by the pressure of the spring 43 as shown. When the control pressure becomes excessive, as the result of seizure of the control valve, the relief valve 49 will lift from its seat and allow liquid to flow from the jack to the exhaust outlet through a passage 51.

As so far described, the control unit 29 operates, as also described in United States application No. 407,536/54, now Patent No. 2,783,006, to maintain in the jack a hydraulic control pressure which increases progressively with airspeed over a predetermined range of airspeeds. Provision is however, made as will now be described, for a change in slope of the curve relating control pressure to airspeed at a predetermined airspeed. This is achieved by means of a normally ineffective diaphragm 52, extending parallel to the diaphragm 44 and urged towards it by a spring 53. The outer surface of the diaphragm 52 is subject to static air pressure $P_s$ applied through an inlet 54. The diaphragm 52 carries a projection 55 moving with lost motion in a projection 56 on the diaphragm 44. When a predetermined airspeed is attained the spring 53 is compressed sufficiently by the diaphragm 52 to take up the lost motion and the diaphragm 52 thereafter exerts on the control valve 36 a force opposing that exerted by the diaphragm 44. The relation between control pressure and airspeed as the airspeed increases further will then depend on the ratio of the effective areas of the diaphragms 44, 52.

The system includes a third diaphragm 57, the opposite faces of which are also exposed to total air pressure $P_t$ applied thereto through an inlet 58 and to static air pressure $P_s$ as indicated. An evacuated capsule 59 is attached to the side of the diaphragm 57 exposed to total pressure, and the diaphragm 57 bears through the agency of a push rod 60 on a pivoted lever 61, carrying a tappet 62 which bears on one end of a lever 63. The lever 63 is pivoted intermediately at 64 and its other end 65 is forked to embrace the push rod 45. When, in response to an increase in airspeed beyond the limit at which the diaphragm 52 becomes effective, a selected Mach number is attained, the diaphragm 57 commences to exert, through the lever 63 a force on a shoulder 66 on the push rod 45 acting in opposition to that exerted by the diaphragm 44. A further change in the characteristic of the feel simulator is thus produced after this selected Mach number has been attained.

As an alternative, the evacuated capsule 59 may be omitted, in which case the diaphragm 57 will become operative to change the characteristic of the feel simulator at a selected higher airspeed instead of at a selected Mach number.

The control unit illustrated in Fig. 2 may also be modified by making the diaphragm 52 responsive to Mach number, by fitting an evacuated capsule to the side thereof exposed to total pressure $P_t$. In this case the diaphragm 52 will become operative to modify the characteristic of the feel simulator at a selected Mach number instead of at a selected airspeed.

What we claim as our invention and desire to secure by Letters Patent is:

1. A hydraulic feel simulator for an aircraft having a control surface, a pilot's control member and servo means operable by said control member to impart movement to said control surface, said feel simulator comprising a source of hydraulic pressure, a housing, a conduit for passage of liquid to and from the housing to establish a variable hydraulic pressure in the housing, a piston movably mounted in the housing, a linkage operative on movement of the control member from a neutral position to effect relative movement of said piston and housing to expel liquid from said housing through said conduit, a control valve normally closing said conduit, said control valve being movable in opposite directions from its normal position to connect said conduit to said pressure source and to exhaust thereby respectively increasing and decreasing the hydraulic pressure in said housing, a duct for subjecting said control valve to the hydraulic pressure in the housing, first and second diaphragms disposed parallel to one another, means for admitting air at total pressure to the space between the diaphragms to act on the facing surfaces thereof, means for admitting air at static pressure to the other faces of said diaphragms, a connection between the first diaphragm and said control valve whereby said first diaphragm exerts on said control valve a force opposing the hydraulic pressure and increasing with airspeed, said control valve being movable by said first diaphragm in response to increase in airspeed to increase the hydraulic pressure in said housing, and a lost motion connection between the two diaphragms, said second diaphragm being movable in response to increase in total pressure to take up the lost motion in said connection and thereafter to exert, on further increase in airspeed, a force on said control valve opposing the force exerted thereon by said first diaphragm.

2. A hydraulic feel simulator as claimed in claim 1, comprising an intermediately pivoted lever having one end adjacent said first diaphragm, and a device responsive to airspeed adjacent the other end of the lever, said responsive device being effective to apply through said lever, when a predetermined airspeed is obtained, a force to said first diaphragm opposing the action of total pressure thereon.

3. A hydraulic feel simulator as claimed in claim 1, comprising an intermediately pivoted lever having one end adjacent said first diaphragm, and a device responsive to Mach number adjacent the other end of the lever, said responsive device being effective to apply through said lever, when a predetermined Mach number is obtained, a force to said first diaphragm opposing the action of total pressure thereon.

References Cited in the file of this patent
UNITED STATES PATENTS 2,445,343    Tyra _____ July 20, 1948